US012084966B2

(12) United States Patent
Sun et al.

(10) Patent No.: US 12,084,966 B2
(45) Date of Patent: Sep. 10, 2024

(54) PUMP HARMONIC NOISE ADVISOR

(71) Applicant: Schlumberger Technology Corporation, Sugar Land, TX (US)

(72) Inventors: Liang Sun, Katy, TX (US); Pavel Annenkov, Houston, TX (US); Arnaud Jarrot, Clamart (FR); David Kirk Conn, Katy, TX (US); Robert Tennent, Cambridge, MA (US); Richard Hunter, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 17/808,651

(22) Filed: Jun. 24, 2022

(65) Prior Publication Data

US 2022/0412212 A1 Dec. 29, 2022

Related U.S. Application Data

(60) Provisional application No. 63/202,786, filed on Jun. 24, 2021.

(51) Int. Cl.
*E21B 47/18* (2012.01)
*H04B 11/00* (2006.01)
*H04B 17/336* (2015.01)

(52) U.S. Cl.
CPC .............. *E21B 47/18* (2013.01); *H04B 11/00* (2013.01); *H04B 17/336* (2015.01)

(58) Field of Classification Search
CPC .......... E21B 47/20; E21B 47/14; E21B 47/18; E21B 47/12; H04B 11/00; H04B 17/336
See application file for complete search history.

(56) References Cited

U.S. PATENT DOCUMENTS

2002/0180613 A1* 12/2002 Shi ..................... E21B 47/18
340/853.1
2007/0132606 A1* 6/2007 Reckmann ........... G01V 11/002
367/82

(Continued)

FOREIGN PATENT DOCUMENTS

WO 2004022916 A1 3/2004

OTHER PUBLICATIONS

Mwachaka et al., "A review of mud pulse telemetry signal impairments modeling and suppression methods", Petroleum Exploration and Production Technology, 2018, 9, pp. 779-792.

(Continued)

*Primary Examiner* — Luke D Ratcliffe
*Assistant Examiner* — Christopher Richard Walker
(74) *Attorney, Agent, or Firm* — Jeffrey D. Frantz

(57) ABSTRACT

A method includes receiving a signal having a telemetry portion and a noise portion. The method may also include identifying one or more harmonic frequencies in the signal. The method may also include determining whether the one or more harmonic frequencies are in a predetermined frequency band. The method may also include determining whether a signal-to-noise ratio (SNR) of the signal is below a predetermined SNR threshold. The method may also include generating one or more notifications in response to the determination whether the one or more harmonic frequencies are in the predetermined frequency band and the determination whether the SNR is below the predetermined SNR threshold.

20 Claims, 5 Drawing Sheets

(56) References Cited

U.S. PATENT DOCUMENTS

| | | | |
|---|---|---|---|
| 2007/0192031 A1* | 8/2007 | Li | E21B 47/18 |
| | | | 702/6 |
| 2010/0314169 A1 | 12/2010 | Jarrot et al. | |
| 2015/0345287 A1* | 12/2015 | White | E21B 47/20 |
| | | | 367/83 |
| 2016/0108725 A1* | 4/2016 | Benson | E21B 47/16 |
| | | | 367/82 |
| 2016/0130937 A1* | 5/2016 | Logan | E21B 47/18 |
| | | | 367/83 |
| 2018/0045043 A1* | 2/2018 | Hernandez | E21B 47/18 |
| 2018/0128097 A1* | 5/2018 | DePavia | E21B 47/13 |
| 2018/0298749 A1* | 10/2018 | Barak | E21B 47/18 |
| 2019/0376384 A1* | 12/2019 | Kusuma | E21B 47/18 |

OTHER PUBLICATIONS

Search Report and Written Opinion of International Patent Application No. PCT/US2022/034915 dated Oct. 7, 2022, 10 pages.

* cited by examiner

PUMP HARMONIC NOISE ADVISOR

CROSS-REFERENCE TO RELATED APPLICATIONS

This application claims priority to U.S. Provisional Patent Application No. 63/202,786, filed on Jun. 24, 2021, the entirety of which is incorporated by reference.

BACKGROUND

In mud pulse telemetry, surface mud pumps may generate pressure variations that are detected by a telemetry receiver with a magnitude that can be many times greater than the pressure variations conveying the telemetry signal from the downhole tool. These pressure variations generated by the surface mud pumps represent noise to the receiver. Mud pump noise may have a harmonic structure with energy concentrated at each multiple frequency of the stroke rate.

The pump harmonic noise frequencies and/or amplitudes can change within even a short period of time. As a result, it is difficult for field engineers to follow the harmonic noise and make corresponding adjustments on the telemetry signal bandwidth (e.g., frequency and/or bit rate) in a timely manner. The telemetry signal-to-noise ratios (SNRs) can be degraded if the harmonics are inside the telemetry frequency band, resulting in poor or failed demodulation and subsequent non-productive time (NPT) associated with mud pump harmonic noise.

SUMMARY

A method for detecting noise in a signal is disclosed. The method includes receiving a signal having a telemetry portion and a noise portion. The method may also include identifying one or more harmonic frequencies in the signal. The method may also include determining whether the one or more harmonic frequencies are in a predetermined frequency band. The method may also include determining whether a signal-to-noise ratio (SNR) of the signal is below a predetermined SNR threshold. The method may also include generating one or more notifications in response to the determination whether the one or more harmonic frequencies are in the predetermined frequency band and the determination whether the SNR is below the predetermined SNR threshold.

A non-transitory computer-readable medium is also disclosed. The medium stores instructions that, when executed by at least one processor of a computing system, cause the computing system to perform operations. The operations include receiving a signal. The signal includes a telemetry portion from a downhole tool in a wellbore and a noise portion from a pump. The telemetry portion and the noise portion each include a plurality of pressure pulses. The operations also include identifying a plurality of harmonic frequencies in the signal that are part of the noise portion of the signal. The operations also include determining a subset of the harmonic frequencies that is stronger than a remainder of the harmonic frequencies. The operations also include determining that the subset of the harmonic frequencies is in a predetermined frequency band. The telemetry portion of the signal is in the predetermined frequency band. The operations also include determining that a signal-to-noise ratio (SNR) of the signal is below a predetermined SNR threshold at least partially in response to the subset of the harmonic frequencies being in the predetermined frequency band. The operations also include generating a notification in response to the subset of the harmonic frequencies being in the predetermined frequency band and the SNR being below the predetermined SNR threshold.

A computing system is also disclosed. The computing system includes one or more processors and a memory system. The memory system includes one or more non-transitory computer-readable media storing instructions that, when executed by at least one of the one or more processors, cause the computing system to perform operations. The operations include receiving a signal. The signal includes a telemetry portion from a downhole tool in a wellbore and a noise portion from a mud pump at a surface. The telemetry portion and the noise portion each include a plurality of pressure pulses. The operations also include identifying a plurality of harmonic frequencies in the signal that are part of the noise portion of the signal. The harmonic frequencies have a strength that is greater than a first predetermined threshold. The operations also include determining a subset of the harmonic frequencies that is stronger than a remainder of the harmonic frequencies. The harmonic frequencies in the subset have a strength that is greater than a second predetermined threshold. The second predetermined threshold is greater than the first predetermined threshold. The operations also include determining that the subset of the harmonic frequencies is in a predetermined frequency band. The telemetry portion of the signal is in the predetermined frequency band. The operations also include determining that a signal-to-noise ratio (SNR) of the signal in the predetermined frequency band is below a predetermined SNR threshold at least partially in response to the subset of the harmonic frequencies being in the predetermined frequency band. The operations also include generating a notification in response to the subset of the harmonic frequencies being in the predetermined frequency band and the SNR in the predetermined frequency band being below the predetermined SNR threshold. The operations also include transmitting an action signal to the downhole tool, the mud pump, or both in response to the notification. The action signal instructs the downhole tool, the mud pump, or both to perform a wellsite action.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

Figure 1:
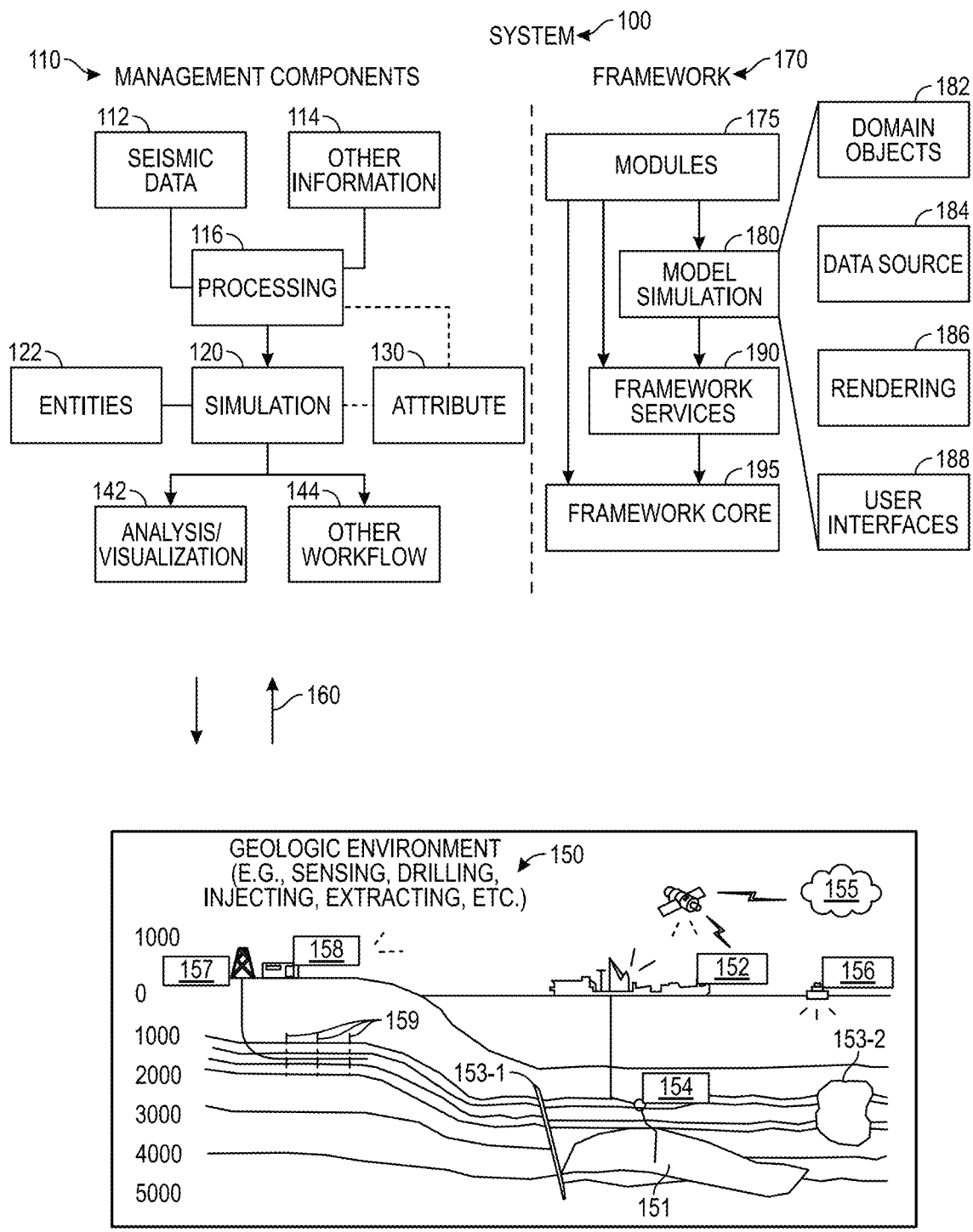
FIG. 1 illustrates an example of a system that includes various management components to manage various aspects of a geologic environment, according to an embodiment.

FIG. 1 illustrates an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data components 112 and other information components 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT® .NET® framework (Redmond, Washington), which provides a set of extensible object classes. In the .NET® framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Texas), the INTERSECT™ reservoir simulator (Schlumberger Limited, Houston Texas), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (Schlumberger Limited, Houston, Texas). The PETREL® framework provides components that allow for optimization of exploration and development operations.

The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Texas) allows for integration of add-ons (or plug-ins) into a PETREL® framework workflow. The OCEAN® framework environment leverages .NET® tools (Microsoft Corporation, Redmond, Washington) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or instead include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Pump Harmonic Noise Advisor

Embodiments of the present disclosure may include an automated system and method for detecting and mitigating noise in signals received by a telemetry receiver. More particularly, the system and method may detect and mitigate the (e.g., negative) impact of harmonic noise caused by surface equipment (e.g., a mud pump) on the quality of service (QOS) for telemetry signals. The telemetry signals may be or include mud pulse telemetry signals, electromagnetic (EM) telemetry signals, or the like.

The system and method may track telemetry data in real-time and feedback to users including pointers to one or more pump harmonic noise frequencies in real-time spectrogram displays. The feedback may also or instead identify the (e.g., top three) strongest harmonic noise(s). The feedback may also or instead include an advice card indicating whether the detected pump harmonic noise is in the telemetry frequency band (i.e., in-band) and/or the signal-to-noise ratio (SNR) is below a predetermined threshold. The feedback may also or instead include suggestions to change the telemetry configuration of the downhole tool and/or telemetry receiver in response to a potential demodulation failure (e.g., due to in-band pump harmonic noise). The feedback may also or instead include suggestions to change the pump stroke rate of the surface pump in response to the potential demodulation failure.

Service quality (SQ) incidents in the "signal demodulation issue/failure" category may represent a measurement-while-drilling (MWD) and/or logging-while-drilling (LWD) failure. The system and method disclosed herein may address the causes that lead to the SQ events in this category to bolster the reliability of MWD and LWD operations (e.g., telemetry). As mentioned above, the system and method may serve as a pump harmonic noise advisor that provides efficient and effective real-time advice to users experiencing difficulty in signal demodulation. The advisor may improve reliability through reducing the telemetry SQ events and promoting remote operation through automation.

Figure 2:
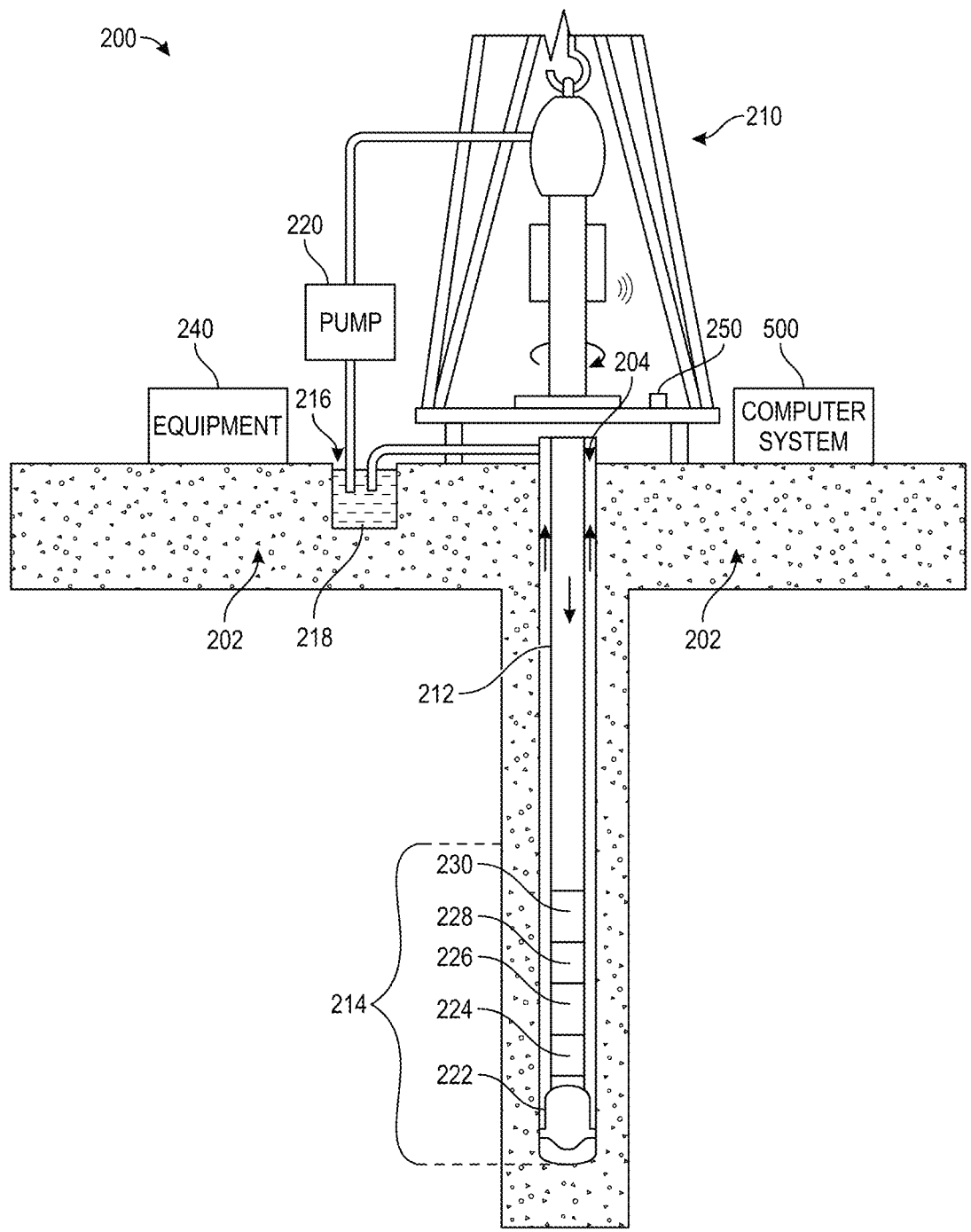
FIG. 2 illustrates a schematic side view of a well site system including a downhole tool that is communicating with a telemetry receiver at the surface, according to an embodiment.

FIG. 2 illustrates a schematic side view of a well site system 200, according to an embodiment. The well site system 200 may include a drilling rig 210 positioned over a subterranean formation 202. The drilling rig 210 may include a drill string 212 with a downhole tool (e.g., a bottom-hole assembly or BHA) 214 coupled to a lower end thereof. The downhole tool 214 may be configured drill a wellbore 204 in the subterranean formation 202.

Drilling fluid or mud 216 may be stored in a pit 218 at the well site. A pump (e.g., a mud pump) 220 may deliver the drilling fluid 216 to the interior of a drill string 212, which causes the drilling fluid 216 to flow downwardly through the drill string 212. The drilling fluid 216 exits the drill string 212 via ports in a drill bit 222 of the downhole tool 214, and then circulates upwardly through an annulus region between the outside of the drill string 212 and a wall of the wellbore 204. In this manner, the drilling fluid 216 lubricates the drill bit 222 and carries formation cuttings up to the surface as it is returned to the pit 218 for recirculation.

The downhole tool 214 may be or include a rotary steerable system ("RSS") 224, a motor 226, LWD tool 228, a MWD tool 230, or a combination thereof. The LWD tool 228 may be configured to measure one or more formation properties and/or physical properties as the wellbore 204 is being drilled or at any time thereafter. The MWD tool 230 may be configured to measure one or more physical properties as the wellbore 204 is being drilled or at any time thereafter. The formation properties may include resistivity, density, porosity, sonic velocity, gamma rays, and the like. The physical properties may include pressure, temperature, wellbore caliper, wellbore trajectory, a weight-on-bit, torque-on-bit, vibration, shock, stick slip, and the like. The measurements from the LWD tool 228 may be sent to the MWD tool 230. The MWD tool 230 may then group the sets of data from the LWD tool 228 and the MWD tool 230 and prepare (e.g., encode) the data for transmission to the surface. The MWD tool 230 may then transmit the encoded data (e.g., formation properties, physical properties, etc.) up to the surface using MWD telemetry signals, for example, mud pulse telemetry signals, EM telemetry signals, and the like.

The well site system 200 may also include equipment 240 at the surface. The equipment 240 may be or include the pump 220, one or more other pumps, one or more generators, one or more compressors, or a combination thereof. As described in greater detail below, the equipment 240 may generate pressure pulses at one or more harmonic noise frequencies. The noise may also or instead be caused by an auto-driller, rotation of the drill string 212, stalling of the mud motor, formation types, or a combination thereof.

One or more telemetry receivers (one is shown: 250) may be configured to detect the telemetry signal from the MWD tool 230. However, in addition to detecting the telemetry signal from the MWD tool 230, the telemetry receiver 250 may also (e.g., inadvertently) detect a noise signal from the equipment 240. The telemetry signal and the noise signal may be transmitted as a combined signal from the telemetry receiver 250 to a computing system 500 (described below). The computing system 500 may then identify and filter out at least a portion of the noise signal from the combined signal to yield the telemetry signal. The computing system may then decode the telemetry signal to recover the data transmitted by the MWD tool 230 (e.g., the formation properties, physical properties, etc.).

Figure 3:
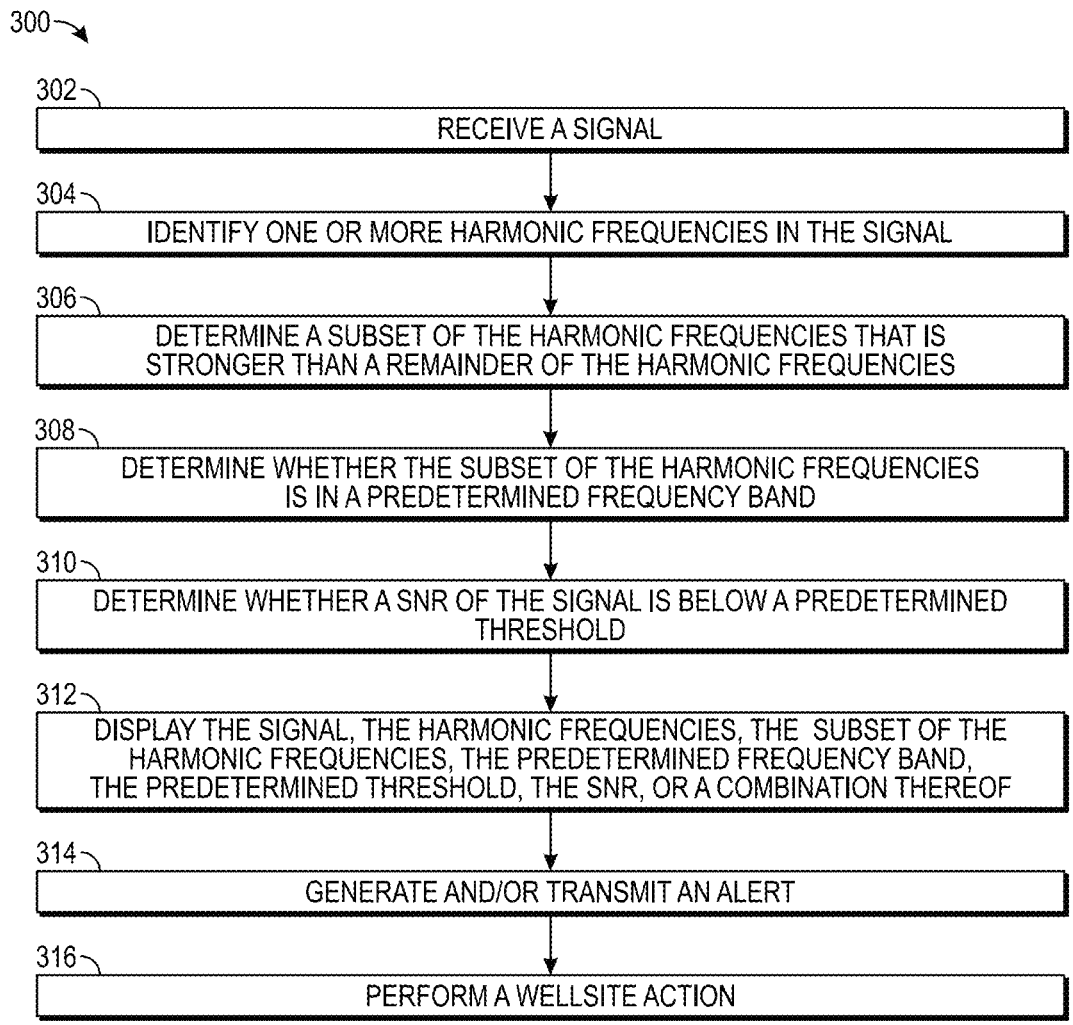
FIG. 3 illustrates a flowchart of a method for communicating with the downhole tool, according to an embodiment.

FIG. 3 illustrates a flowchart of a method 300 for communicating with the downhole tool 214, according to an embodiment. An illustrative order of the method 300 is provided below; however, one or more portions of the method 300 may be performed in a different order, combined, split into sub-portions, repeated, or omitted without departing from the scope of the disclosure. One or more portions of the method 300 may be performed by the computing system 500.

Figure 4:
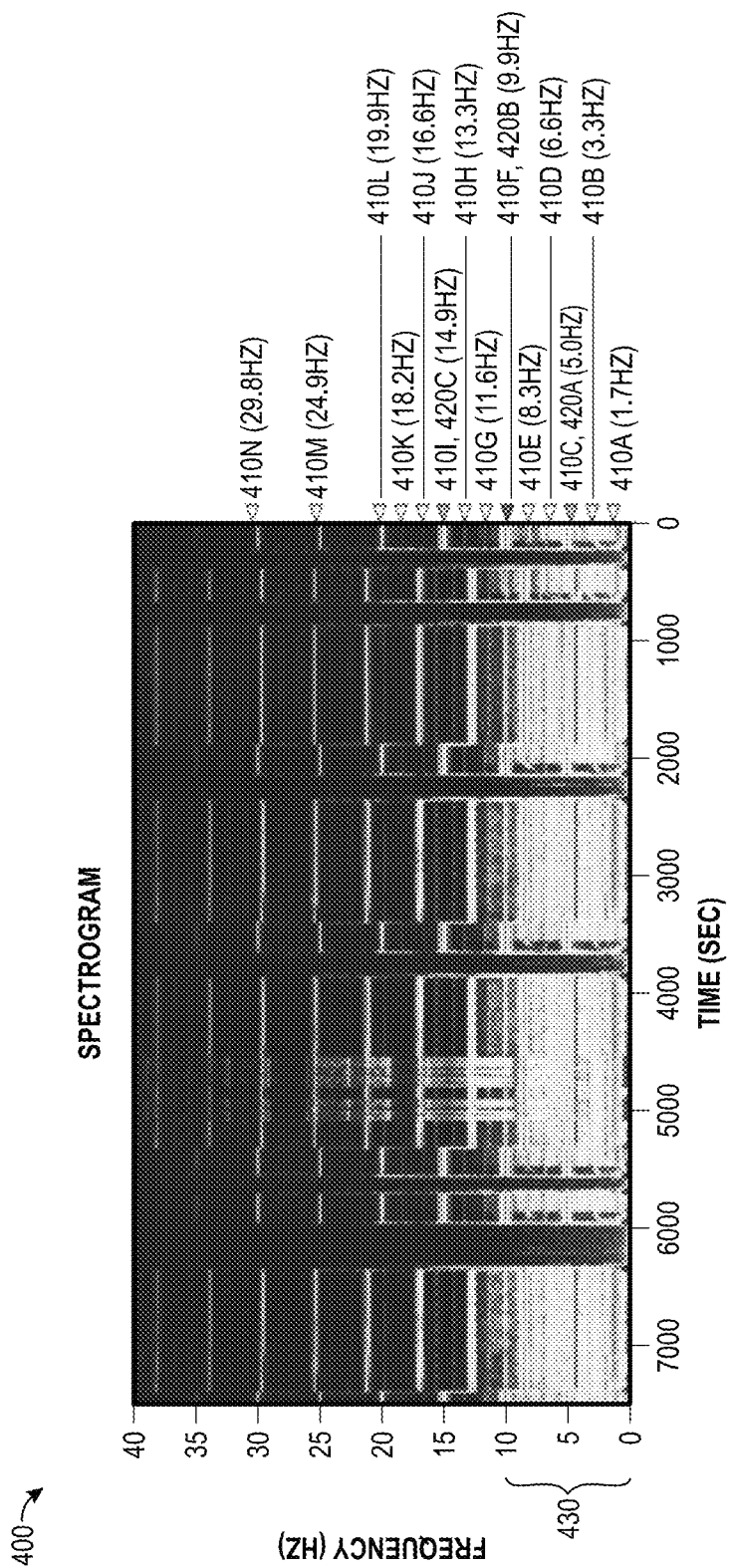
FIG. 4 illustrates a spectrogram of a signal including a first (e.g., telemetry) portion from the downhole tool and a second (e.g., noise) portion from surface equipment, according to an embodiment.

The method 300 may include receiving a signal, as at 302. FIG. 4 illustrates a spectrogram 400 of the signal, according to an embodiment. The signal may be received by the telemetry receiver 250 and subsequently by the computing system 500. As mentioned above, the signal may include a first (e.g., telemetry) portion and a second (e.g., noise) portion. The telemetry portion may be or include one or more pressure pulses from the downhole tool 214 in the wellbore 204 (i.e., the mud pulse telemetry signal). The noise portion may be or include one or more pressure pulses from the equipment 240. In another embodiment, the telemetry portion and the noise portion may instead be or include EM pulses.

The method 300 may also include identifying one or more harmonic frequencies in the signal, as at 304. Fourteen different harmonic frequencies 410A-410N are identified in the spectrogram 400. The fundamental frequencies of multiple cyclical waveforms may be identified by an algorithm, based on interpreting the short-term power spectrum of a signal, using Bayesian techniques. A Kalman filter may subsequently be used to build a prediction-correction model for time-varying frequency and amplitude in harmonics structure. The harmonic frequencies may be from the pressure pulses generated by the equipment (e.g., the mud pump) 240. The signal at the harmonic frequencies may have a strength (e.g., amplitude) greater than a first predetermined threshold. The first predetermined threshold may be selected by a user or determined by a constant or a variable corresponding to telemetry signal strength (e.g., amplitude).

The method 300 may also include determining a subset (e.g., one or more) of the harmonic frequencies that is/are stronger than a remainder of the harmonic frequencies, as at 306. As a specific example, the three strongest harmonic frequencies 420A-420C are identified in the spectrogram 400. In other examples, any number of harmonic frequencies may be identified. In another example, the subset of the harmonic frequencies may be each of the harmonic frequencies at which the signal has a strength (e.g., amplitude) greater than a second predetermined threshold. The second predetermined threshold may be selected by a user or determined by a constant or a variable corresponding to telemetry signal strength (e.g., amplitude).

The method 300 may also include determining whether the subset of the harmonic frequencies is in a predetermined frequency band, as at 308. The predetermined frequency band 430 is shown in the spectrogram 400. The predetermined frequency band 430 may be determined by (or based at least partially upon) the modulation scheme, carrier frequency, and/or bit rate of the transmitted telemetry signal. The telemetry portion of the signal may be within the predetermined frequency band 430.

The method 300 may also include determining whether a signal-to-noise ratio (SNR) of the signal is below a predetermined SNR threshold, as at 310. The SNR is the ratio of the telemetry signal power to noise power within the bandwidth of a receiver. The predetermined SNR threshold may not be dependent upon knowledge of which part of the signal is noise. The determination may be in response to the subset of the one or more harmonic frequencies 420A-420C being in the predetermined frequency band 430. In one embodiment, determining whether the SNR is below the predetermined SNR threshold may include determining whether the SNR in the predetermined frequency band 430 is below the predetermined SNR threshold, even if the SNR outside of the predetermined frequency band 430 is above the predetermined SNR threshold. In an example, the predetermined SNR threshold may be 10 dB.

The method 300 may also include displaying the signal, as at 312. This may include generating the spectrogram 400 which includes the signal, the harmonic frequencies 410A-410N, the subset of the harmonic frequencies 420A-420C, the predetermined frequency band 430, the predetermined threshold, the SNR, or a combination thereof. The spectrogram 400 is a visual representation of the telemetry signal and noise energy over time at various frequencies.

The method 300 may also include generating and/or transmitting a notification (e.g., alert), as at 314. The notification may be in response to the subset of the one or more harmonic frequencies 420A-420C being in the predetermined frequency band 430. The notification may also or instead be in response to the SNR being below the predetermined SNR threshold. For example, a first notification may be generated in response to the subset of the one or more harmonic frequencies 420A-420C being in the predetermined frequency band 430 in combination with the SNR being below the predetermined SNR threshold. The first notification may indicate that the one or more harmonic frequencies 410A-410N and/or the subset of the harmonic frequencies 420A-420C from the equipment 240 is/are degrading the SNR of the signal received by the telemetry receiver 250. A second notification may be generated in response to the subset of the one or more harmonic frequencies 420A-420C being in the predetermined frequency band 430 while the SNR is above the predetermined SNR threshold. A third notification may be generated in response to the subset of the one or more harmonic frequencies 420A-420C being outside the predetermined frequency band 430 while the SNR is below the predetermined SNR threshold. A fourth notification may be generated in response to the subset of the one or more harmonic frequencies 420A-420C being outside the predetermined frequency band 430 while the SNR is above the predetermined SNR threshold.

The method 300 may also include performing a wellsite action, as at 316. This may include the computing system 500 providing an instruction and/or transmitting an action signal to perform the wellsite action. The action signal may be transmitted to the downhole tool 214, the equipment 240, the telemetry receiver 250, or a combination thereof. The wellsite action may be in response to the subset of the harmonic frequencies 420A-420C being in the predetermined frequency band 430, the SNR being below the predetermined SNR threshold, the notification, or a combination thereof. In one example, the wellsite action may include changing a telemetry configuration. Changing the telemetry configuration may include changing the telemetry signal transmitting frequency, bit rate, modulation scheme, or a combination thereof. The telemetry configuration may be changed in the downhole tool 214, the telemetry receiver 250, the computing system 500, or a combination thereof. In another example, the wellsite action may include modifying the pump stroke rate of the equipment 240. In another example, the wellsite action may include training the computing system 500 to filter out the noise portion of the signal in real-time as the noise portion changes. More particularly, this may include, for example, running an adaptive noise cancellation algorithm. In yet another example, the wellsite action may include turning down or off the equipment 240 that is generating the noise.

The method may also include recommending that a wellsite action be performed. For example, the recommendation may be one or more of the wellsite actions described herein. In one embodiment, the recommendation is provided to a user on a graphical user interface of a software product. The recommendation may be provided by way of a notification. The recommendation may be the insertion of the wellsite action in a list of activities or actions to take. Other approaches to providing a recommendation to a user may also be used.

Example

When an in-band harmonic frequency is detected, and the SNR is less than the predetermined SNR threshold (e.g., 10 dB), a harmonic advice card generated by the computing system 500 may present a first mark (e.g., a red 'X' mark) with the words "Interference Detected." Selecting the pump harmonic advice card may generate a pop-up tab with more detailed information including the frequency(s) of in-band pump harmonics and/or suggestions (e.g., wellsite actions), etc. When an in-band harmonic frequency is not detected, a second mark (e.g., green check) may be presented on the advice card to indicate that no in-band harmonic frequency has been detected. When an in-band harmonic is detected and/or the SNR is greater than or equal to the predetermined SNR threshold (e.g., 10 dB), a third mark (e.g., a yellow exclamation point) may be presented with the words "Interference Detected" on the advice card. Precautionary measures may be taken to ensure the telemetry signal demodulation quality in response to the first mark, the second mark, the third mark, or a combination thereof. These measures may include increasing transmitted signal power, moving to lower signal transmitting frequency, etc.

Figure 5:
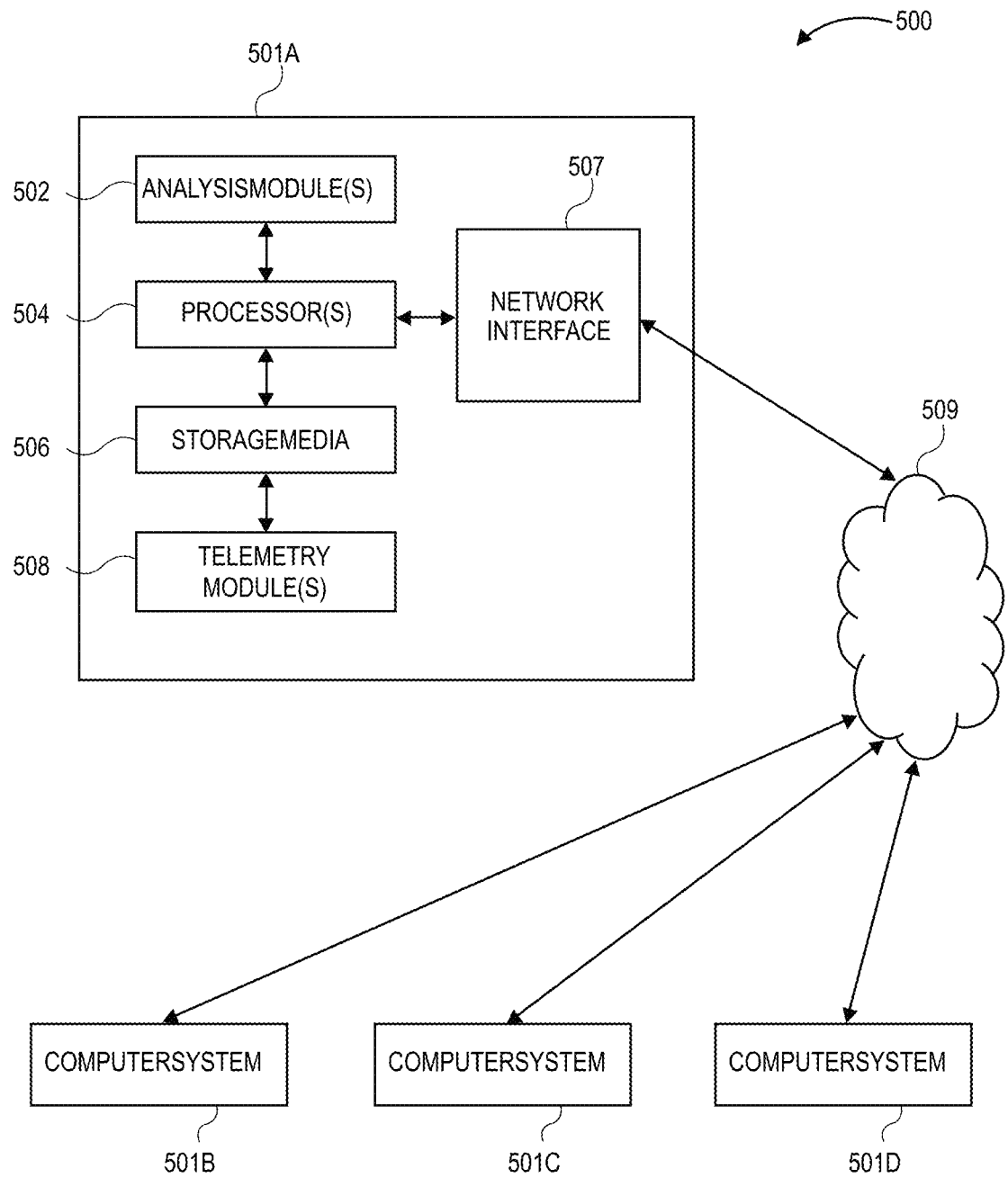
FIG. 5 illustrates a computing system for performing at least a portion of the method, in accordance with some embodiments.

In some embodiments, the methods of the present disclosure may be executed by a computing system. FIG. 5 illustrates an example of such a computing system 500, in accordance with some embodiments. The computing system 500 may include a computer or computer system 501A, which may be an individual computer system 501A or an arrangement of distributed computer systems. The computer system 501A includes one or more analysis modules 502 that are configured to perform various tasks according to some embodiments, such as one or more methods disclosed herein. To perform these various tasks, the analysis module 502 executes independently, or in coordination with, one or more processors 504, which is (or are) connected to one or more storage media 506. The processor(s) 504 is (or are) also connected to a network interface 507 to allow the computer system 501A to communicate over a data network 509 with one or more additional computer systems and/or computing systems, such as 501B, 501C, and/or 501D (note that computer systems 501B, 501C and/or 501D may or may not share the same architecture as computer system 501A, and may be located in different physical locations, e.g., computer systems 501A and 501B may be located in a processing facility, while in communication with one or more computer systems such as 501C and/or 501D that are located in one or more data centers, and/or located in varying countries on different continents).

A processor may include a microprocessor, microcontroller, processor module or subsystem, programmable integrated circuit, programmable gate array, or another control or computing device.

The storage media 506 may be implemented as one or more computer-readable or machine-readable storage media. Note that while in the example embodiment of FIG. 5 storage media 506 is depicted as within computer system 501A, in some embodiments, storage media 506 may be distributed within and/or across multiple internal and/or external enclosures of computing system 501A and/or additional computing systems. Storage media 506 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 500 contains one or more telemetry module(s) 508 configured to perform at least a portion of the method 300. It should be appreciated that computing system 500 is merely one example of a computing system, and that computing system 500 may have more or fewer components than shown, may combine additional components not depicted in the example embodiment of FIG. 5, and/or computing system 500 may have a different configuration or arrangement of the components depicted in FIG. 5. The various components shown in FIG. 5 may be implemented in hardware, software, or a combination of both hardware and software, including one or more signal processing and/or application specific integrated circuits.

Further, the steps in the processing methods described herein may be implemented by running one or more functional modules in information processing apparatus such as general-purpose processors or application specific chips, such as ASICs, FPGAs, PLDs, or other appropriate devices. These modules, combinations of these modules, and/or their combination with general hardware are included within the scope of the present disclosure.

Computational interpretations, models, and/or other interpretation aids may be refined in an iterative fashion; this concept is applicable to the methods discussed herein. This may include use of feedback loops executed on an algorithmic basis, such as at a computing device (e.g., computing system 500, FIG. 5), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principals of the disclosure and its practical applications, to thereby enable others skilled in the art to best utilize the disclosed embodiments and various embodiments with various modifications as are suited to the particular use contemplated.

What is claimed is:

1. A method, comprising:
   receiving a signal comprising a telemetry portion and a noise portion;
   identifying one or more harmonic frequencies in the signal that are part of the noise portion of the signal;
   determining whether the one or more harmonic frequencies are in a predetermined frequency band;
   determining whether a signal-to-noise ratio (SNR) of the signal is below a predetermined SNR threshold; and
   generating one or more notifications in response to:
      the determination whether the one or more harmonic frequencies are in the predetermined frequency band; and
      the determination whether the SNR is below the predetermined SNR threshold.

2. The method of claim 1, wherein the telemetry portion and the noise portion each comprise a plurality of pressure pulses.

3. The method of claim 1, wherein the telemetry portion is from a downhole tool in a wellbore, and wherein the noise portion is from a surface equipment.

4. The method of claim 1, wherein the telemetry portion of the signal is in the predetermined frequency band, and wherein a range of the predetermined frequency band is based on the carrier frequency of the telemetry portion of the signal.

5. The method of claim 1, wherein the one or more notifications comprise a first visual notification in response to the one or more harmonic frequencies being in the predetermined frequency band and the SNR being below the predetermined SNR threshold.

6. The method of claim 5, wherein the one or more notifications comprise a second visual notification in response to the one or more harmonic frequencies being in the predetermined frequency band and the SNR being above the predetermined SNR threshold, wherein the second visual notification differs from the first visual notification.

7. The method of claim 6, wherein the one or more notifications comprise a third visual notification in response to the one or more harmonic frequencies being outside of the predetermined frequency band, wherein the third visual notification differs from the first and second visual notifications.

8. The method of claim 1, further comprising generating a spectrogram that displays at least a portion of the signal and graphically identifies the one or more harmonic frequencies in the predetermined frequency band.

9. The method of claim 1, further comprising performing a wellsite action in response to the determination whether the one or more harmonic frequencies are in the predetermined frequency band and the determination whether the SNR is below the predetermined SNR threshold.

10. A non-transitory computer-readable medium storing instructions that, when executed by at least one processor of a computing system, cause the computing system to perform operations, the operations comprising:
receiving a signal comprising:
a telemetry portion from a downhole tool in a wellbore; and
a noise portion from a pump,
wherein the telemetry portion and the noise portion each comprise a plurality of pressure pulses;
identifying a plurality of harmonic frequencies in the signal that are part of the noise portion of the signal;
determining a subset of the harmonic frequencies that is stronger than a remainder of the harmonic frequencies;
determining that the subset of the harmonic frequencies is in a predetermined frequency band, wherein the telemetry portion of the signal is in the predetermined frequency band;
determining that a signal-to-noise ratio (SNR) of the signal is below a predetermined SNR threshold at least partially in response to the subset of the harmonic frequencies being in the predetermined frequency band; and
generating a notification in response to the subset of the harmonic frequencies being in the predetermined frequency band and the SNR being below the predetermined SNR threshold.

11. The method of claim 1, wherein the predetermined frequency band is based on a modulation scheme of the telemetry portion of the signal, a bit rate of the telemetry portion of the signal, or both.

12. The non-transitory computer-readable medium of claim 10, further comprising generating an action signal to recommend that a wellsite action be performed in response to the notification, wherein the wellsite action comprises changing a telemetry configuration of the downhole tool.

13. The non-transitory computer-readable medium of claim 10, further comprising generating an action signal to recommend that a wellsite action be performed in response to the notification, wherein the wellsite action comprises changing a pump stroke rate of the pump.

14. The non-transitory computer-readable medium of claim 10, further comprising training, via an adaptive noise cancellation algorithm, the computing system to filter out the noise portion of the signal as the noise portion changes.

15. The non-transitory computer-readable medium of claim 10, wherein the operations further comprise generating a spectrogram that displays the signal, the harmonic frequencies, the subset of the harmonic frequencies, and the predetermined frequency band.

16. A computing system, comprising:
one or more processors; and
a memory system comprising one or more non-transitory computer-readable media storing instructions that, when executed by at least one of the one or more processors, cause the computing system to perform operations, the operations comprising:
receiving a signal comprising:
a telemetry portion from a downhole tool in a wellbore; and
a noise portion from a mud pump at a surface,
wherein the telemetry portion and the noise portion each comprise a plurality of pressure pulses;
identifying a plurality of harmonic frequencies in the signal that are part of the noise portion of the signal, wherein the harmonic frequencies have a strength that is greater than a first predetermined threshold;
determining a subset of the harmonic frequencies that is stronger than a remainder of the harmonic frequencies, wherein the harmonic frequencies in the subset have a strength that is greater than a second predetermined threshold, and wherein the second predetermined threshold is greater than the first predetermined threshold;
determining that the subset of the harmonic frequencies is in a predetermined frequency band, wherein the telemetry portion of the signal is in the predetermined frequency band;
determining that a signal-to-noise ratio (SNR) of the signal in the predetermined frequency band is below a predetermined SNR threshold at least partially in response to the subset of the harmonic frequencies being in the predetermined frequency band;
generating a notification in response to the subset of the harmonic frequencies being in the predetermined frequency band and the SNR in the predetermined frequency band being below the predetermined SNR threshold; and
transmitting an action signal to the downhole tool, the mud pump, or both in response to the notification, wherein the action signal instructs the downhole tool, the mud pump, or both to perform a wellsite action.

17. The computing system of claim 16, wherein the action signal is transmitted to the downhole tool, and wherein the wellsite action comprises changing a telemetry configuration of the downhole tool.

18. The computing system of claim 16, wherein the action signal is transmitted to the mud pump, and wherein the wellsite action comprises changing a pump stroke rate of the mud pump.

19. The computing system of claim 16, further comprising generating a spectrogram that displays the signal, the harmonic frequencies, the subset of the harmonic frequencies, and the predetermined frequency band.

20. The computing system of claim 16, further comprising determining that the SNR of the signal outside of the predetermined frequency band is above the predetermined SNR threshold.

\* \* \* \* \*